United States Patent
Sigmund et al.

(10) Patent No.: US 8,774,773 B1
(45) Date of Patent: Jul. 8, 2014

(54) SYSTEMS AND METHODS FOR SELECTIVELY ALLOWING COMMUNICATION OF A VOICE-CALL-AVAILABILITY STATUS FOR A MOBILE DEVICE

(75) Inventors: William J. Sigmund, Cumming, GA (US); Mark Enzmann, Roswell, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 822 days.

(21) Appl. No.: 11/533,143

(22) Filed: Sep. 19, 2006

(51) Int. Cl.
*H04M 3/42* (2006.01)

(52) U.S. Cl.
USPC ............... 455/414.1; 455/466; 379/201.1

(58) Field of Classification Search
USPC ............ 455/414.1, 432.1, 466; 379/201.1
See application file for complete search history.

(56) References Cited

U.S. PATENT DOCUMENTS

| | | | |
|---|---|---|---|
| 2002/0024947 A1* | 2/2002 | Luzzatti et al. | 370/352 |
| 2002/0156844 A1* | 10/2002 | Maehiro | 709/203 |
| 2003/0086402 A1* | 5/2003 | Yang | 370/338 |
| 2003/0125062 A1* | 7/2003 | Bethards et al. | 455/517 |
| 2004/0176100 A1* | 9/2004 | Florkey et al. | 455/456.1 |
| 2005/0043022 A1* | 2/2005 | Okon et al. | 455/422.1 |
| 2005/0119118 A1* | 6/2005 | Walsh et al. | 502/303 |
| 2005/0143111 A1* | 6/2005 | Fitzpatrick et al. | 455/518 |
| 2005/0148350 A1* | 7/2005 | Kamphuis | 455/466 |
| 2005/0164681 A1* | 7/2005 | Jenkins et al. | 455/412.1 |
| 2005/0246396 A1* | 11/2005 | Oreizy et al. | 707/204 |
| 2005/0249196 A1* | 11/2005 | Ansari et al. | 370/352 |
| 2005/0260975 A1* | 11/2005 | Chen et al. | 455/415 |
| 2006/0009243 A1* | 1/2006 | Dahan et al. | 455/466 |
| 2006/0121923 A1* | 6/2006 | East | 455/518 |
| 2006/0182242 A1* | 8/2006 | Henry et al. | 379/114.01 |
| 2007/0015507 A1* | 1/2007 | Petronelli | 455/435.2 |
| 2007/0118809 A1* | 5/2007 | Ozugur et al. | 715/776 |
| 2007/0121867 A1* | 5/2007 | Ozugur et al. | 379/201.1 |
| 2007/0130200 A1* | 6/2007 | Ogren | 707/104.1 |
| 2007/0197219 A1* | 8/2007 | Ryu et al. | 455/434 |
| 2007/0250580 A1* | 10/2007 | Caspi et al. | 709/206 |
| 2008/0261565 A1* | 10/2008 | Kunz et al. | 455/414.1 |

* cited by examiner

*Primary Examiner* — Mahendra Patel
*Assistant Examiner* — Edd Rianne Plata
(74) *Attorney, Agent, or Firm* — Parks IP Law LLC; Mickki D. Murray, Esq.

(57) ABSTRACT

A mobile communication device having a feature enhanced contact list and related systems and methods are described. The enhanced contact list can display a voice call availability indication for one or more contact list entries. The contact list can be updated by sending a voice call availability query from the communication device to a wireless network. The communication device can be configured to construct such a query and send it to the network. The network can be configured to receive the query, obtain voice call availability information for one or more contacts and return this information to the requesting mobile device for presentation on a display of that device.

15 Claims, 10 Drawing Sheets

SYSTEMS AND METHODS FOR SELECTIVELY ALLOWING COMMUNICATION OF A VOICE-CALL-AVAILABILITY STATUS FOR A MOBILE DEVICE

TECHNICAL FIELD

This invention relates generally to mobile communications systems, and more particularly to providing enhanced contact list features on a mobile device.

BACKGROUND OF THE INVENTION

A mobile communications system refers generally to any telecommunications system which enables wireless communication within the service area of the system. A typical mobile communications system is a Public Land Mobile Network (PLMN). Often the mobile communications network is an access network providing a user with wireless access to external networks, hosts, or services offered by specific wireless service providers. In most cases, the user has a subscriber's profile that is held in a Home Public Land Mobile Network (HPLMN). When the user roams to other networks, i.e., a Visited Public Land Mobile Network (VPLMN), calls to that user are first routed to the HPLMN and then forwarded to the VPLMN so the user can receive the call.

In Global System for Mobile communications (GSM), the term mobile station is used to refer to a combination of mobile equipment, i.e., a wireless telephone, and a Subscriber Identification Module (SIM). The SIM allows a user to subscribe to services offered by a wireless service provider, regardless of specific mobile equipment. The mobile equipment is identified by an International Mobile Equipment Identity (IMEI). The SIM includes an International Mobile Subscriber Identity (IMSI) to identify the user to the wireless service provider and provides a secret key for authentication. The IMEI and IMSI are independent, therefore allowing a SIM and its corresponding IMSI to be inserted into different mobile equipment.

One feature available on many of today's mobile stations is a contact list. A contact list allows a user to store names, telephone numbers, physical addresses, email addresses, and other relevant contact information. Most often, a user is given the option to store contact information in a memory of the mobile equipment and/or on the SIM. If a user chooses to store contact information on the SIM, then the contact information can be easily transported to different mobile equipment. If a user chooses to store contact information in the mobile equipment's memory, then the contact information is only available on that mobile equipment. Moreover, the quantity of contacts and type of contact information capable of being stored in the mobile equipment's memory is usually larger and different than that of the SIM. Mobile equipment memory allows a user to assign and store ring tones, graphics, and other personalization features to each contact in the user's contact list. The SIM allows a user to store name, number, email address, and physical address information.

Another feature available on many of today's mobile stations is instant messaging. Instant messaging is a real-time message exchange service. A common feature of instant messaging clients is the ability to populate and maintain a list of contacts. A user can be alerted when a contact from the user's list comes online, and the list of contacts can indicate which of the contacts are currently available for interactive communication. Today, instant messaging is available on cellular telephones and other mobile devices. Instant messaging can be used to send mobile-to-mobile, computer-to-mobile, and mobile-to-computer messages.

The features described above provide users a way to maintain contact information for and to communicate with contacts in a mobile communication system. However, current mobile communication systems do not allow a user's telephone contact list to provide information regarding the availability of a specific contact for communicating via a voice call. Therefore, a heretofore unaddressed need exists to provide a system and method for providing availability information to mobile station users within a mobile communication system.

SUMMARY OF THE INVENTION

A mobile communication device for providing a voice call availability status of a remote mobile device is disclosed. The mobile device can comprise a transceiver, a processor, a graphical display, and a computer readable memory. The computer readable memory can include a stored contact as well as instructions for the processor. The instructions can direct the processor to read the stored contact to obtain the address, create a voice call availability query for the address, transmit the voice call availability query to the mobile communication network, receive a voice call availability response comprising the voice call availability status for the remote communication device from the mobile communication network, and show the voice call availability status on the graphical display.

The instructions can additionally direct the processor to present a list of contacts stored in the computer readable memory on the graphical display and accept a user selection of a contact from the list of contacts. The voice call availability status can comprise a name associated with the contact and an indication of whether the remote communication device can currently accept voice calls. The voice call availability status can additionally include an indication of whether the remote communication device is connected to a HPLMN. The voice call availability query can comprise a GPRS message, an SMS message, an SNMP message, or a page.

A system for providing voice call availability status to a mobile communication device is also disclosed. The system can comprise a mobile switching center configured to receive a voice call availability query from the mobile device, and configured to return a voice call availability response to the mobile device, where the voice call availability response indicates whether the second mobile device is available for incoming voice calls.

A method according to the present invention can comprise receiving a voice call availability query from a mobile device, querying a second mobile device, and returning a voice call availability response to the requesting mobile device indicating whether the second mobile device is available for incoming voice calls.

DETAILED DESCRIPTION

As required, detailed embodiments of the present invention are disclosed herein. It must be understood that the disclosed embodiments are merely exemplary of the invention that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

Figure 1:
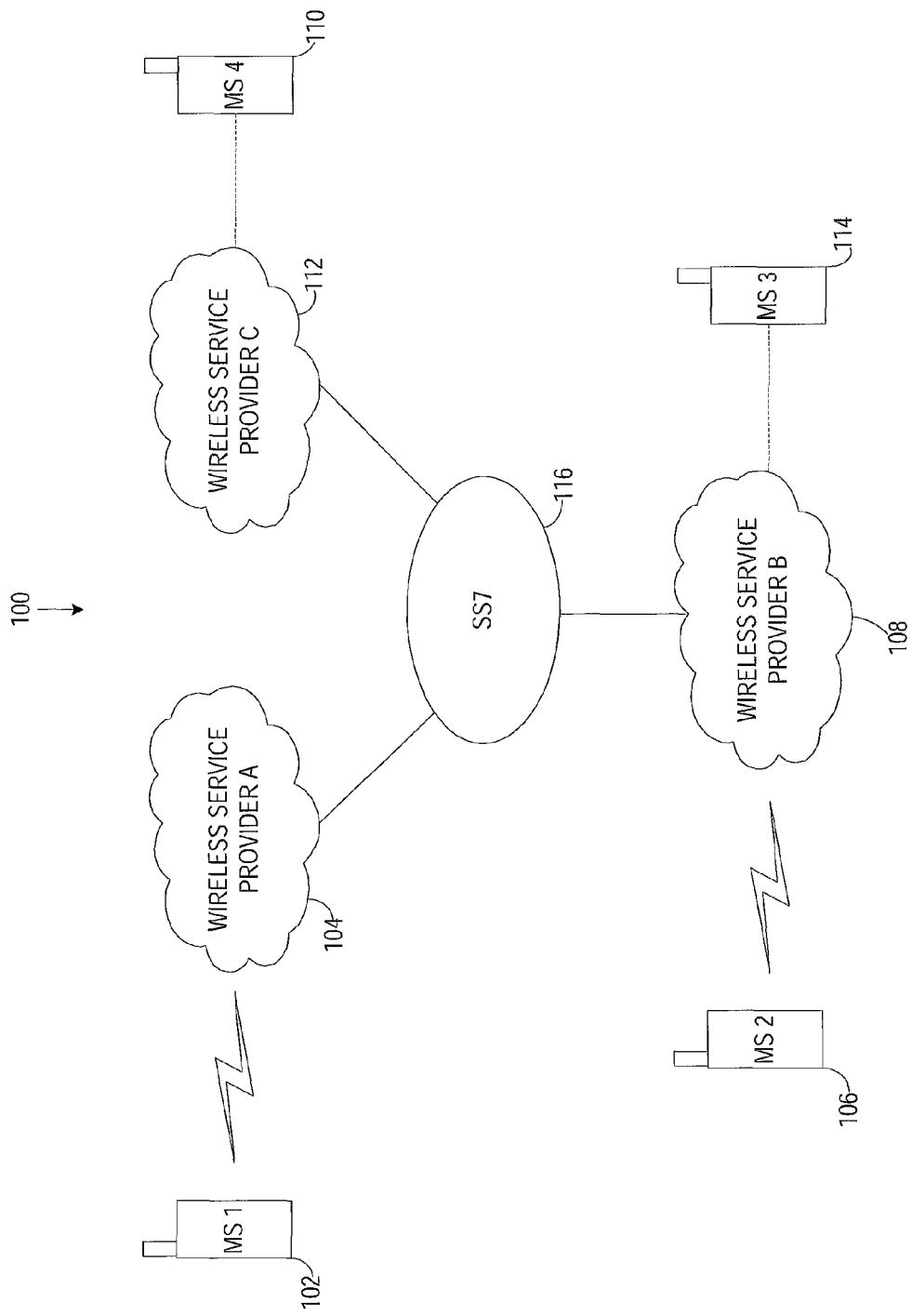
FIG. 1 is a block diagram illustrating an embodiment of a mobile communications system including mobile stations in communication with various wireless service providers.

Referring now to the drawings in which like numerals represent like elements throughout the several views, FIG. 1 depicts a block diagram of a mobile communications system 100 including mobile stations in communication with various wireless service providers. Mobile station 1 102 is in communication with wireless service provider A 104. Mobile station 2 106 is in communication with wireless service provider B 108. Mobile station 3 114 is associated with wireless service provider B 108 (i.e., subscribed to and authorized to use wireless service from wireless service provider B), but is currently not in communication with wireless service provider B 108. Mobile station 4 110 is associated with wireless service provider C 112 (i.e., subscribed to and authorized to use wireless service from wireless service provider C), but is currently not in communication with wireless service provider C 112. Mobile station is a term often used in describing the mobile equipment and a Subscriber Identification Module (SIM) in Global System for Mobile communications (GSM) and Universal Mobile Telecommunications Systems (UMTS) networks, however, mobile station is used herein to encompass all mobile communication devices regardless of air interface type and wireless technology used including, but not limited to, Time Division Multiple Access (TDMA), General Packet Radio Service (GPRS), Code Division Multiple Access (CDMA), Global System for Mobile communications (GSM), Wideband Code Division Multiple Access (WCDMA), Enhanced Data rates for Global Evolution (EDGE), any combination thereof, and the like.

Wireless service providers 104, 108, 112 are interconnected via Signaling System 7 (SS7) architecture 116 which utilizes SS7 protocol. The wireless service providers 104, 108, 112 can be in communication with a Public Switched Telephone Network (not shown). The type of air interface used and wireless technology employed by the wireless service providers in FIG. 1 and in each subsequent drawing can be of any type known to those skilled in the art. The quantities of mobile stations, wireless service providers, networks, and parts thereof as illustrated in FIG. 1 and in each subsequent drawing are not meant to be interpreted as limiting, but are provided as an aid to teach the present invention, thus, it is contemplated that the quantities can be as large or as small as is necessary to effectively and efficiently practice the present invention.

Figures 2A, 2B:
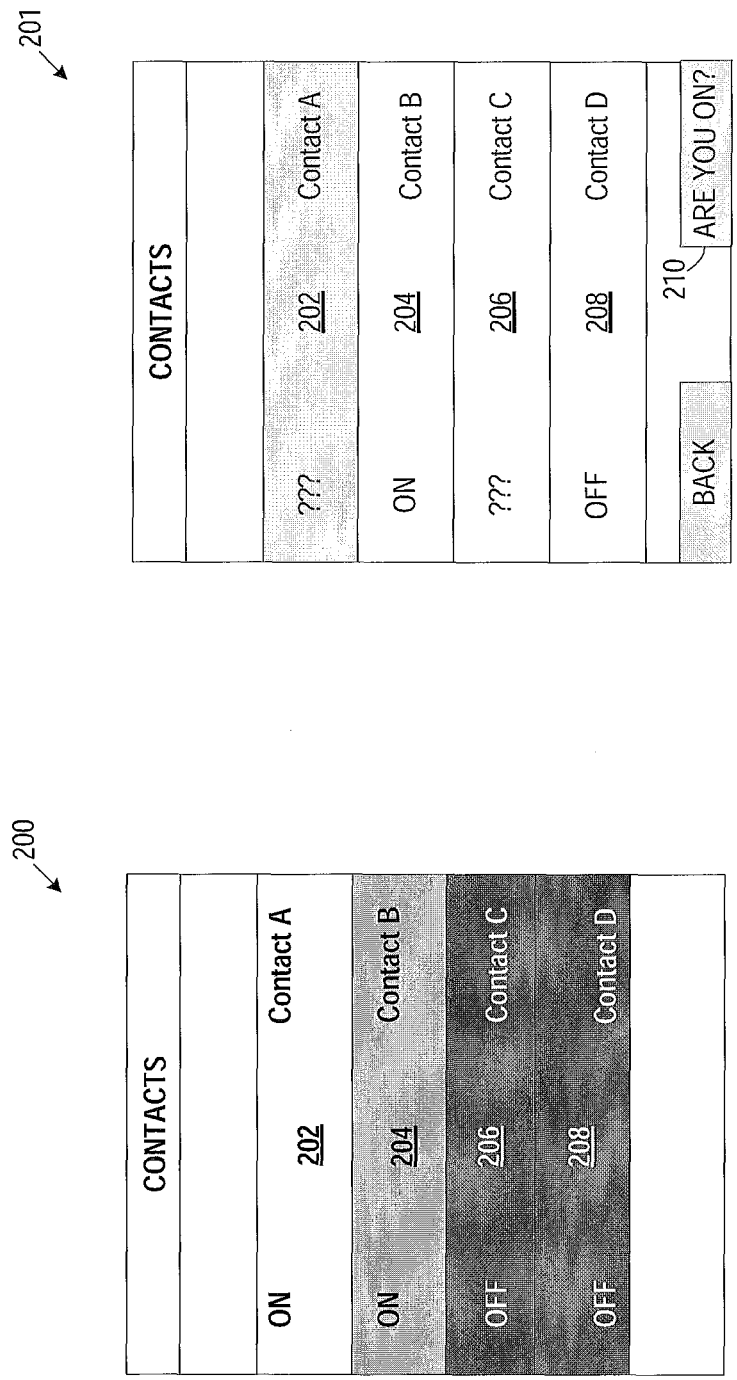
FIG. 2A shows an example contacts screen on a display of a mobile station providing periodically updated voice call availability information for remote mobile devices.
FIG. 2B shows an example contacts screen on a display of a mobile station providing voice call availability information for remote mobile devices which can be updated upon user request.

FIG. 2A shows a contacts screen 200, according to the present invention. The present invention can interrogate a remote mobile station to determine its availability to receive incoming voice calls. That is, the present invention determines if the mobile station is currently in communication with a wireless network. The contacts screen 200 is configured to display the availability of mobile stations as being on or off a wireless network (availability, as used herein, refers to a mobile station's ability to receive voice calls based on its current network connection status). A mobile station is on a wireless network if the mobile station is registered with a wireless service provider via a base station system (BSS). A mobile station is off a wireless network if the mobile station is not registered with a wireless service provider via a BSS. In some embodiments the present invention can interrogate a mobile station to determine if the mobile station is reachable on the querying device's home wireless network, i.e., a Home Public Land Mobile Network (HPLMN), on a Public Land Mobile Network (PLMN) (communicating with some wireless network, but not the wireless network of the querying device), or off the PLMN (not in communication with a wireless network to enable voice communication). A PLMN is a generic name for all wireless networks that use base stations. An HPLMN identifies the PLMN in which a wireless network subscriber's profile is held. Wireless network subscribers that roam to other networks receive information from the HPLMN to, among other things, determine billing requirements for the wireless network subscriber. A Visited Public Land Mobile Network (VPLMN) is that PLMN on which the wireless network subscriber is roaming. In the example contacts screen 200, Contact A 202 and contact B 204 are shown as being on a network (i.e., on the PLMN), whereas contact C 206 and contact D 208 are shown as being off a network (i.e., off the PLMN). In addition to the on/off designation given to each contact in the Contacts screen 200, an availability identifier can be used. The availability identifier can be a color, gradient, and/or transparency used to highlight the text, a color text, an icon, or any combination thereof, and the like. It is further contemplated that an icon can be any rendering suitable to indicate the availability status of a contact. For example, the icon used to indicate the contact is unavailable can be a colored X or any other rendering. By further example, the icon used to indicate the contact is available can be a rendering of the contact, or any other rendering a user chooses to associate with that contact being available.

An audible alert can also be utilized, including a variety of tones, music, and other audible alert types.

The availability identifier used in the illustrated contacts screen 200 is a combination of both a gray-scale highlight, and a black or white text, however, an exemplary embodiment of the present invention (as described in FIG. 3) uses color text as an indication of availability.

Contact A 202 is shown as being on in black text, with its background color being white to indicate the contact is reachable via the HPLMN. Contact B 204 is shown as being on in black text, with a medium gray background to indicate the contact is reachable via some network, but not the HPLMN of the querying device. Contact C 206 and Contact D 208 are shown as being off in white text, with a dark gray background to indicate that these contacts are not reachable on the PLMN; for example, the mobile stations are turned off or are in an area where no coverage is available. The voice call availability information shown in FIG. 2A can be updated periodically so that the information is relatively current when a user of the device having the contacts screen 200 wishes to place a call, the information can be viewed and used in deciding whether to place a voice call to a given contact.

FIG. 2B shows an alternative contacts screen 201. Using a cursor positioning key of the mobile device, one of the contacts in the list can be selected. Once the desired contact has been selected, the soft button key 210 can be selected to initiate an interrogation procedure to determine if the selected contact is available to receive a voice call. Contact A 202 is shown as highlighted so that selecting the soft button "Are you on?" 210 would cause an interrogation procedure to be initiated to determine if Contact A 202 is available to receive a voice call. "???" are shown to indicate that the voice call availability of Contact A is unknown. Contact B 204 on the other hand is shown as being available to receive voice calls. This can be due to Contact B having been previously interrogated within some time window such that the information is still considered to be of value. If for example, the Contact B was interrogated within the last 5 minutes, the voice call availability information can remain in the contacts list. After 5 minutes, the information can expire and "ON" can be replaced with "???" to indicate that the voice call availability is unknown.

Similarly Contact C's 206 availability is shown as being unknown. Contact D's 208 availability is shown as being "OFF". It should be understood that various indicators can be used in place of those discussed here without departing from the scope of the present invention. Methods of interrogating remote mobile stations to determine their voice call availability are described below. It should be understood that any of these methods, alone, or in combination can be used to provide voice call availability information.

Furthermore, a voice call availability information enabled contact list such as those shown in FIGS. 2A and 2B can be implemented through program code stored in a computer readable memory of a mobile device, such as mobile device 1 102. The program code can comprise software and/or firmware. The program code can comprise instructions for making a processor of the mobile device operable to display the contact list on a display of the mobile device and provide the functionality described herein. The program code can comprise a voice call availability device application. Interrogation messages sent from the mobile device and response messages received from the network can be handled by this application.

Blocks are used below in the illustrated methods to represent steps of the exemplary methods. The arrangement of the illustrated blocks (steps) is not meant to limit the present invention and it is contemplated that the steps of the exemplary methods can be followed in any order capable of achieving a similar result.

Figure 3:
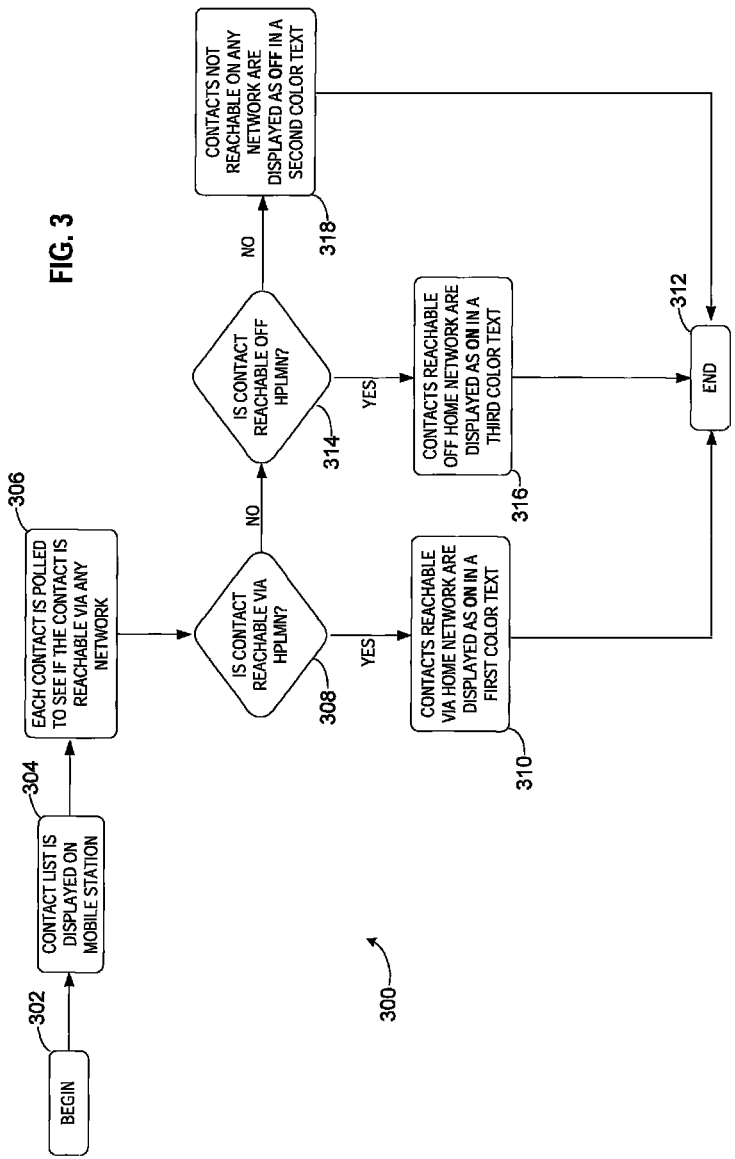
FIG. 3 is a flow chart of an exemplary method for determining the voice call availability of a contact on a network.

FIG. 3 shows a flow chart of an exemplary method 300 for showing contact availability status. The exemplary method 300 begins at block 302 and proceeds to block 304, where a contact list is displayed on a mobile station. The contact list can be substantially similar to the above-described contacts screen 200. At block 306, each contact is polled to determine if the contact is reachable via any available network, i.e., a PLMN. The methods by which each contact is polled are described below. At block 308, a decision is made based on whether the contact is reachable via a home network, i.e., an HPLMN. If the contact is reachable via an HPLMN, the exemplary method 300 proceeds to block 310, where the contact can be displayed as being on and a first color text availability identifier can be used to distinguish the contact's availability from other contacts in the contact list. The exemplary method 300 then proceeds to block 312 and the exemplary method 300 ends. If the contact is not reachable via the HPLMN, the exemplary method 300 proceeds to block 314, where a decision is made based on whether the contact is reachable off the HPLMN. If the contact is reachable off the HPLMN, the exemplary method 300 proceeds to block 316, where the contact can be displayed as being on and a third color text availability identifier can be used to distinguish the contact's availability from other contacts in the contact list. The exemplary method 300 then proceeds to block 312 and the exemplary method 300 ends. If the contact is not reachable on any network, i.e., the contact is off the PLMN, the exemplary method 300 proceeds to block 318, where the contact can be displayed as being off and a second color text availability identifier can be used to distinguish the contact's availability from other contacts in the contact list. The exemplary method 300 then proceeds to block 312 and the exemplary method 300 ends. It is contemplated that the first, second, and third color text availability identifiers can have any hue, chromaticity, saturation, and brightness. Alternatively, no color is used, and text icons or other identifiers are employed. In some embodiments, two color indicators are used to denote on or off without regard to whether the network used is an HPLMN or a VPLMN.

Determining Availability Status via HLR/VLR

Figure 4:
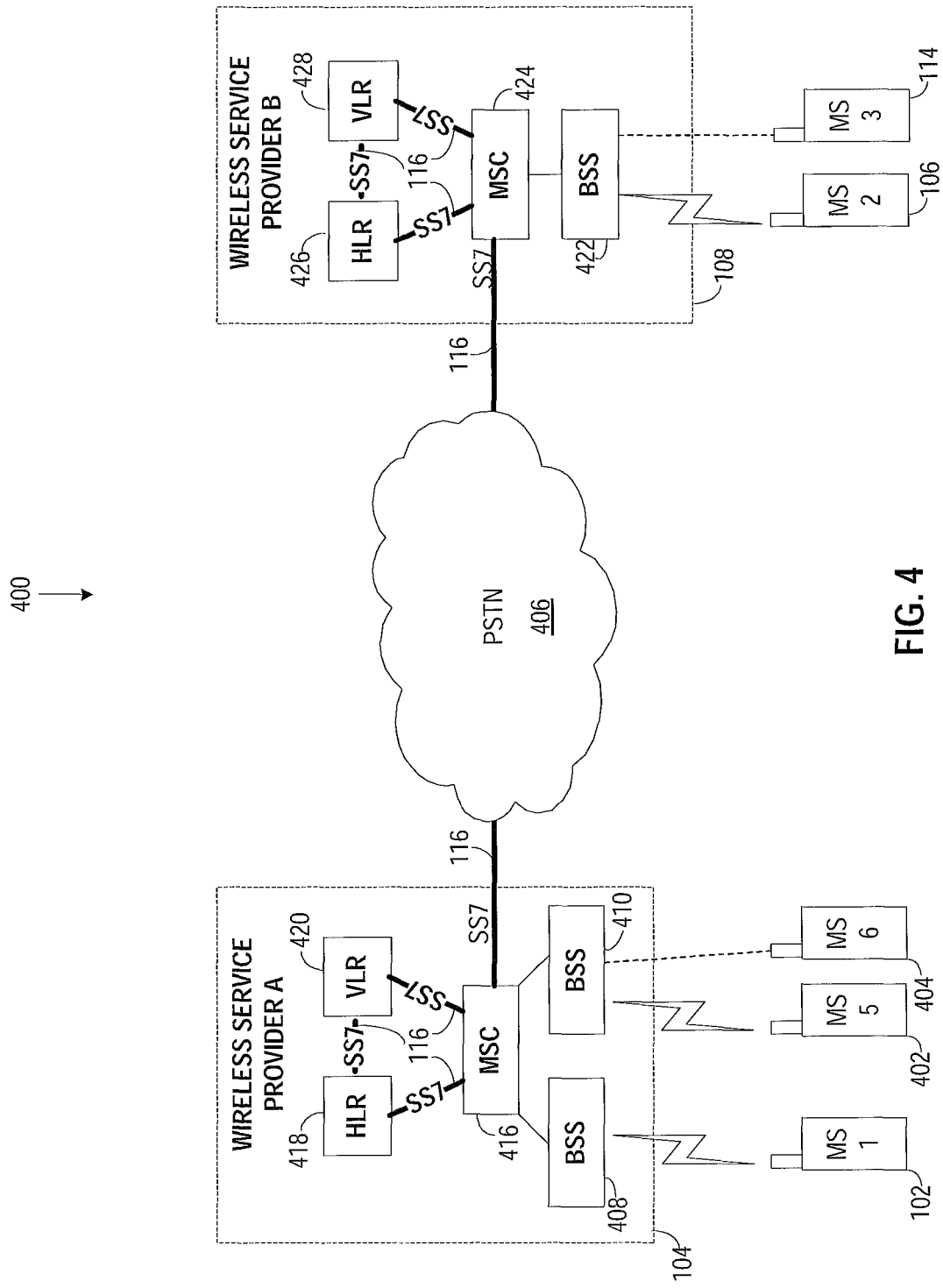
FIG. 4 is a block diagram illustrating an embodiment of a mobile communications system for determining the voice call availability of a contact on a network using a wireless service provider's home location and visiting location registers.

FIG. 4 shows a mobile communications system 400 for determining the availability of a contact on a network using a wireless service provider's home location and visiting location registers. In the illustrated mobile communications system 400, wireless service provider A 104 and wireless service provider B 108 are each coupled to a public switched telephone network (PSTN) 406. Mobile station 1 102 is in communication with wireless service provider A 104 via base station system (BSS) 408. Mobile station 5 402 is in communication with wireless service provider A 104 via BSS 410. Mobile station 6 404 is associated with wireless service provider A 104 (i.e., subscribed to and authorized to use wireless service from wireless service provider A), but is not currently in communication with service provider A. The BSSs 408 and 410 can include one or more base station controllers (BSC) operatively linked to one or more base transceiver stations (BTSs), which are connected to antennas for radiating transmitted signals and for receiving incoming signals. Moreover, the BSSs 408 and 410 are operatively linked to mobile switching center (MSC) 416, which in turn is operatively linked via SS7 trunks 116 to a home location register (HLR) 418 and a visiting location register (VLR) 420.

Mobile station 2 106 is in communication with wireless service provider B 108 via BSS 422. Mobile station 3 114 is associated with wireless service provider B 108 (i.e., subscribed to and authorized to use wireless service from wireless service provider B), but is not currently in communication with service provider B. The BSS 422 can include one or more BSCs operatively linked to one or more BTSs, which are connected to antennas for radiating transmitted signals and for receiving incoming signals. Moreover, the BSS 422 is operatively linked to MSC 424, which in turn is operatively linked via SS7 trunks 116 to an HLR 426 and a VLR 428.

Figure 5:
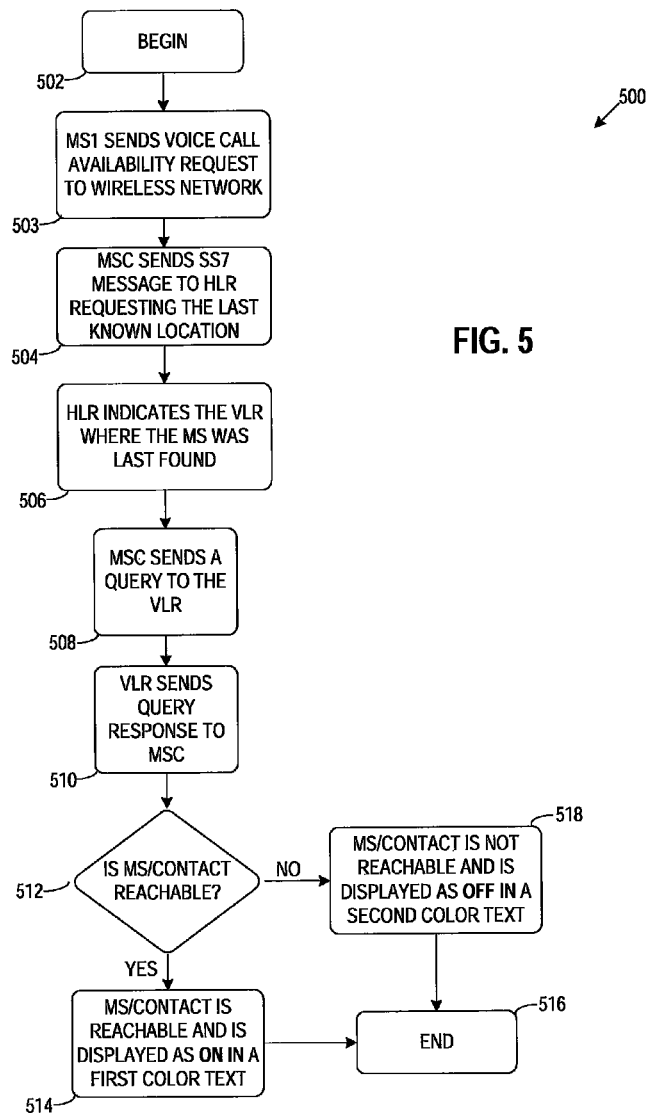
FIG. 5 is a flow chart of an exemplary method for determining the voice call availability of a contact on a network using a wireless service provider's home location and visiting location registers.

FIG. 5 shows a flow chart of an exemplary method 500 for determining the availability of a contact on a network using a wireless service provider's home location and visiting location registers. The exemplary method 500 is first described with reference to mobile stations in communication with wireless service provider A 104 (i.e., on the HPLMN). A user can either request the availability status at the time of interest, or the availability status can automatically be updated in real-time or close to real-time for a specific contact, or group of contacts. The methods below describe a status inquiries/interrogations initiated by mobile station 1 102.

The method 500 begins at block 502 and proceeds to block 503 where mobile station 1 102 sends a voice availability information request to its wireless network (wireless network A 104). The request can include the telephone number of the mobile device for which the information is being requested. The request can be received at BSS 408 and forwarded to MSC 416.

The method proceeds to block 504, where the MSC 416 sends an SS7 message to the HLR 418 requesting the last known location of a remote mobile station associated with the telephone number. At block 506, the HLR 418 responds to the MSC indicating the VLR, for example, VLR 420, where the remote mobile station was last registered. At block 508, the MSC 416 sends a query to the VLR 420. The query can be an SS7 message used to determine if the remote mobile station is currently registered with the VLR 420. At block 510, the VLR 420 sends a query response to the MSC 416 indicating whether the remote mobile station is registered with the VLR 420. The MSC 416 receives the query response forwards the availability information to mobile station 1 102. At decision block 512, if it is determined if the contact is reachable on the HPLMN, for example, mobile station 5 402, the method proceeds to block 514, where the contact can be displayed as being on and a first color text availability identifier can be used to distinguish the contact's availability from other contacts in the contact list. (The advantage of noting whether the contact is available on the HPLMN is to provide mobile subscribers with an indication that they share the same wireless provider as a given contact. This can generate goodwill between the user and the service provider's business due to benefits of sharing a service provider with a contact such as free in-network calling.) If the user is available to receive voice calls, but is not on the HPLMN of mobile station 1, the contact can be displayed as on and a second color (or other indication) can be used to distinguish this contact.

The method then proceeds to block 516 where the method ends. If the contact is not reachable, for example, mobile station 6 404, the method proceeds to block 518, where the contact can be displayed as being off and a third color text availability identifier can be used to distinguish the contact's availability from the other contacts in the contact list. The method then proceeds to block 516 and the method ends.

A similar method can be used to determine if a contact is available off the HPLMN, for example, on a network of wireless service provider B 108. The method 500 begins at block 502 and proceeds to block 503 where mobile station 1 102 sends a voice availability information request to its wireless network (wireless service provider A 104). The request can include the telephone number of the mobile device for which the information is being requested. The request can be received at BSS 408 and forwarded to MSC 416. The MSC 416 can determine from the telephone number using the appropriate queries that the telephone number belongs to a device subscribed to wireless service provider B 108.

The method proceeds to block 504, where the MSC 416 sends an SS7 message across the PSTN 406 to MSC 424. MSC 424 queries HLR 426 requesting the last known location of the mobile station. At block 506, the HLR 426 responds to the MSC 424 indicating the VLR, for example, VLR 428, where the mobile station was last found. At block 508, the MSC 424 sends a query to the VLR 428. The query can be an SS7 message used to determine if the remote mobile station is registered with the VLR 428. At block 510, the VLR 428 sends a query response to the MSC 424. The query response can be an SS7 message that includes the VLR's 428 determination of whether the remote mobile station is registered with the VLR 428. MSC 424 can forward the voice availability information to MSC 416. MSC 416 can provide the information to mobile station 1 102. At decision block 512, if the contact is reachable on the VPLMN, for example, mobile station 2 106, the method proceeds to block 514, where the contact can be displayed as being on and a second color text availability identifier can be used to distinguish the contact's availability from other contacts in the contact list. The method then proceeds to block 516 and the method ends. If the contact is not reachable on the VPLMN, for example, mobile station 4 414, the method proceeds to block 518, where the contact can be displayed as being off and a third color text availability identifier can be used to distinguish the contact's availability from the other contacts in the contact list. The method then proceeds to block 516 and the method ends.

Determining Availability Status via GPRS

Figure 6:
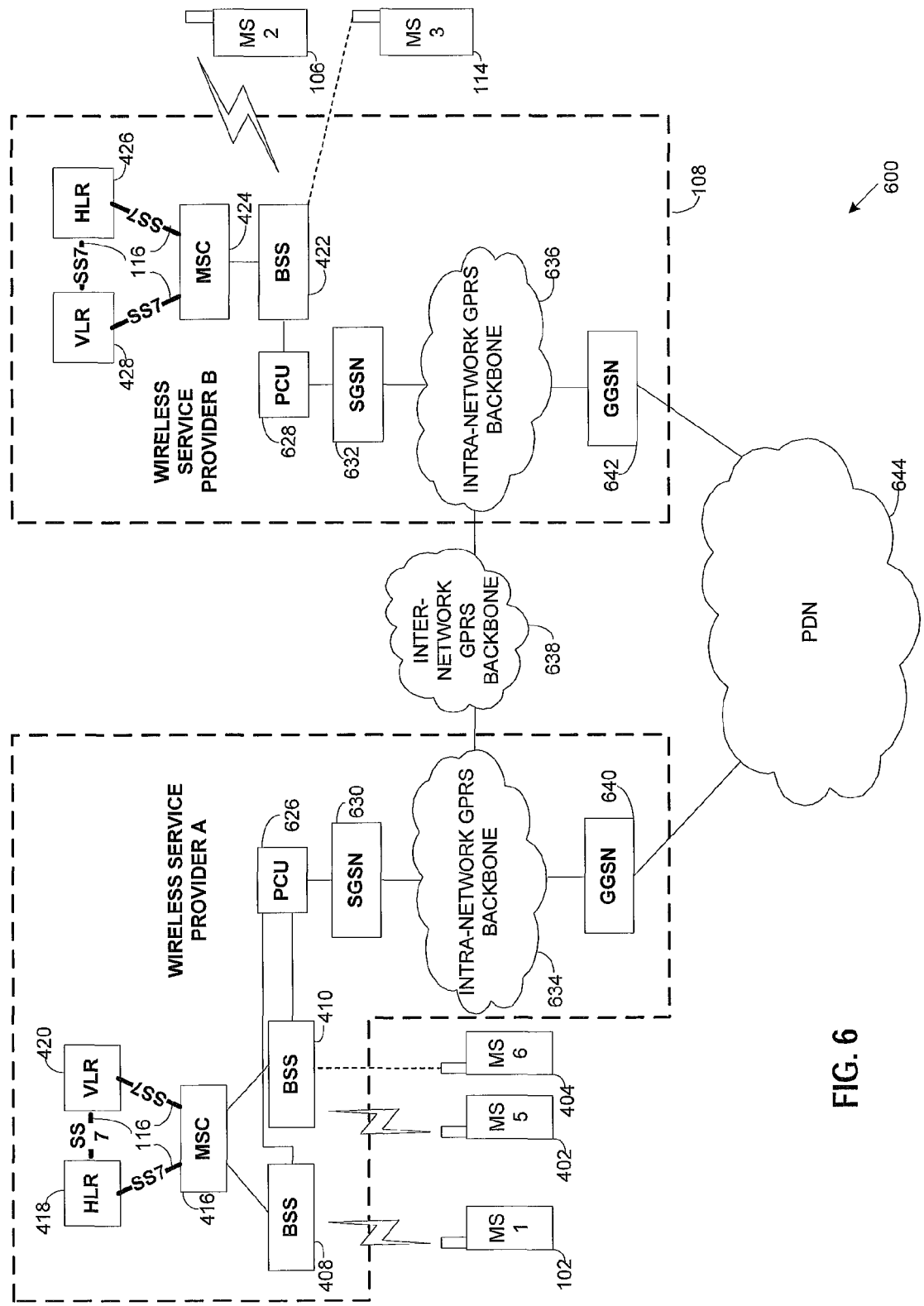
FIG. 6 is a block diagram illustrating an embodiment of a mobile communications system for determining voice call availability of a contact on a network using General Packet Radio Service (GPRS).

FIG. 6 shows a mobile communications system 600 for determining availability of a contact on a network using General Packet Radio Service (GPRS). In the illustrated mobile communications system 600, wireless service provider A 104 and wireless service provider B 108 are each coupled to a public data network (PDN) 644 and an inter-network GPRS backbone 638. Mobile station 1 102 is in communication with wireless service provider A 104 via BSS 408. Mobile station 5 402 is in communication with wireless service provider A 104 via BSS 410. Mobile station 6 402 is associated with wireless service provider A 104 (i.e., subscribed to and authorized to use wireless service from wireless service provider A), but is not currently in communication with service provider A. The BSSs 408 and 410 can include one or more BSCs operatively linked to one or more BTSs, which are connected to antennas for radiating transmitted signals and for receiving incoming signals. Further, the BSSs 408 and 410 are operatively linked to MSC 416, which in turn is operatively linked via SS7 trunks 116 to an HLR 418 and a VLR 420. Furthermore, the BSSs 408 and 410 are in communication with a packet control unit (PCU) 626, which in turn is in communication with a serving general packet radio service support node (SGSN) 630. The SGSN 630 can be in communication with an intra-network GPRS backbone 634. The intra-network GPRS backbone 634 is in communication with both an inter-network GPRS backbone 638 and a gateway GPRS support node (GGSN) 640. The GGSN 640 provides a secure gateway to the PDN 644.

Mobile station 2 106 is in communication with wireless service provider B 108 via BSS 422. Mobile station 3 114 is associated with wireless service provider B 108 (i.e., subscribed to and authorized to use wireless service from wireless service provider B), but is not currently in communication with service provider B. The BSS 422 can include one or more BSCs operatively linked to one or more BTSs, which are connected to antennas for radiating transmitted signals and for receiving incoming signals. Further, the BSS is operatively linked to MSC 424, which in turn is operatively linked via SS7 trunks 116 to an HLR 426 and a VLR 428. Furthermore, the BSS 422 is in communication with a PCU 628, which in turn is in communication with an SGSN 632. The SGSN 632 can be in communication with an intra-network GPRS backbone 636. The intra-network GPRS backbone 636 is in communication with both the inter-network GPRS backbone 638 and a gateway GPRS support node (GGSN) 642. The GGSN 642 provides a secure gateway to the PDN 644.

The PCUs 626 and 628 are logically associated with one of the BSCs and is positioned between one of the BTSs and the SGSNs 630 and 632. The PCUs 626 and 628 are responsible for all radio related aspects of the network. The intra-network GPRS backbones 634 and 636 are the internal GPRS networks for wireless service providers 104 and 108, and are used to communicate data packets within the respective wireless service providers 104 and 108. The inter-network GPRS backbone 638 connects intra-network GPRS backbone 634 to intra-network GPRS backbone 636 to facilitate communication of data between the wireless service providers 104 and 108. The PDN 644 can include the Internet and various intranets. Typically, data sent from the PDN 644 using the GPRS network is billed to a customer based on the number of kilobytes sent and kilobytes received.

Figure 7:
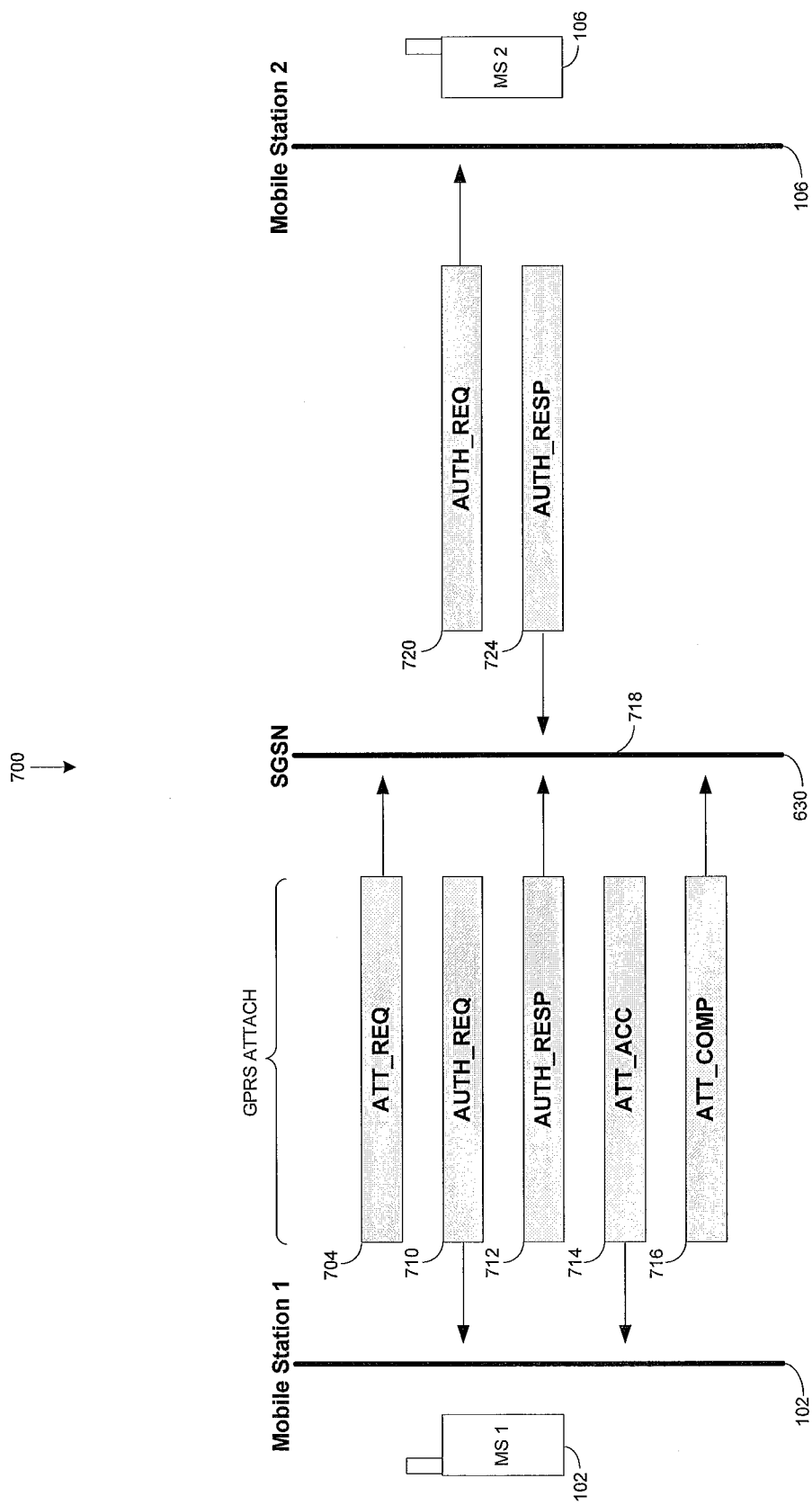
FIG. 7 shows a GPRS data message sequence chart for obtaining voice call availability information.
Figure 8:
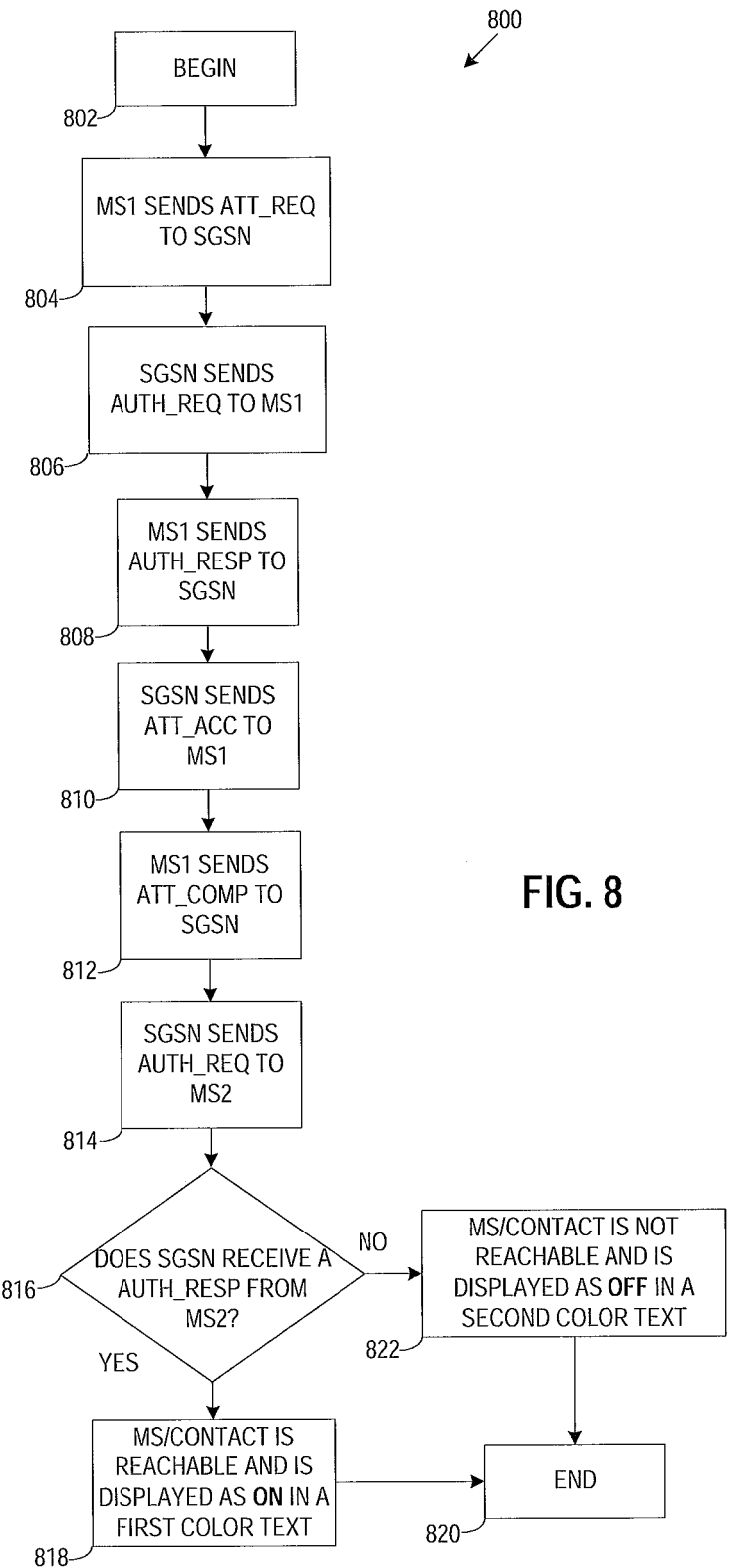
FIG. 8 is a flow chart of an exemplary method for determining the voice call availability of a contact on a network using GPRS.

FIG. 7 shows an exemplary messaging sequence 700 for obtaining voice call availability information for mobile station 2 106. FIG. 8 shows a flow chart of an exemplary method 800 for obtaining voice call availability information via GPRS. The exemplary messaging sequence 700 and the exemplary method 800 are described with reference to mobile communications system 600, as a messaging sequence and method for a mobile station to obtain voice call availability information for a contact on a VPLMN (e.g., a method for mobile station 1 102 to obtain availability status for mobile station 2 106). A user can either request the availability status at the time of interest, or the availability status can automatically be updated in real-time or close to real-time for a specific contact, or group of contacts.

The exemplary method 800 begins at block 802 and proceeds to block 804, where mobile station 1 102 sends an Attach Request (ATT_REQ) message 704 to the SGSN 630. The ATT_REQ message 704 can include mobile station 1's 102 International Mobile Subscriber Identification (IMSI). The IMSI includes a mobile country code (MCC), a mobile network code (MNC), and a mobile station identification number (MSIN) used to identify the country of origin, wireless service provider network, and subscriber, respectively, to the SGSN 630. Though the method is described with regard to an inter-network voice call availability query, a GPRS attach message sequence can be performed within a network, for example, mobile station 1 102 can obtain availability status from mobile station 5 402 and mobile station 6 404.

At block 806, the SGSN 630 sends an Authentication Request (AUTH_REQ) message 710 to mobile station 1 102. In the AUTH_REQ message 710, the SGSN 630 can include a Packet-Temporary Mobile Subscriber Identity (P-TMSI). The P-TMSI is associated with a Temporary Logical Link Identifier (TLLI) that provides a communication address between mobile station 1 102 and the SGSN 630. The P-TMSI is used to page mobile station 1 102 in order to acquire location information for the SGSN 630. The SGSN 630 can use the P-TMSI to monitor the location of mobile station 1 602 as it moves throughout a network. At block 808, mobile station 1 102 sends an Authentication Response (AUTH_RESP) message 712 to the SGSN 630. After this authentication process, at block 810, the SGSN 630 sends an Attach Accept (ATT_ACC) message 714 to mobile station 1 102. Mobile station 1 102 responds at block 812 with an Attach Complete (ATT_COMP) message 716 and the GPRS attach 718 between mobile station 1 102 and the SGSN 630 is completed. Mobile station 1 102 is now capable of communicating with the PDN 644.

Mobile Station 1 102 can include an address book application in its memory which queries the PDN 644 for status information regarding one or more address book entries stored in mobile station 1 102 (either in onboard memory, a SIM card, or other memory associated with mobile station 1). The address book application can cause mobile station 1 to send a Packet Data Protocol Request to the SGSN 630 to query the station of a device, for example, mobile device 2 106. The application checks the status of each entry in the address book and reflects the status accordingly.

At block 814, the SGSN 630 sends an Authentication Request (AUTH_REQ) message 720 to mobile station 2 106. At block 816, if the SGSN 630 receives an Authentication Response (AUTH_RESP) message 724 from mobile station 2 106 the method proceeds to block 818, where the contact can be displayed as being on and a second color text availability identifier can be used to distinguish the contact's availability from other contacts in the contact list. The address book application can check the status of each entry in the address book and reflect its status accordingly.

In an alternative embodiment, where the communicating mobile stations are on the same network (i.e., the HPLMN), the contact can be displayed as being on and a first color text availability identifier can be used to distinguish the contact's availability from other contacts in the contact list. The method then proceeds to block 820 and the method ends. If the SGSN 630 does not receive an Authentication Response (AUTH_RESP) message 724 from mobile station 2 106, the method proceeds to block 822, where the contact can be displayed as being off and a third color text availability identifier can be used to distinguish the contact's availability from the other contacts in the contact list. The method then proceeds to block 820 and the method ends.

Determining Availability Status via SMS

Figure 9:
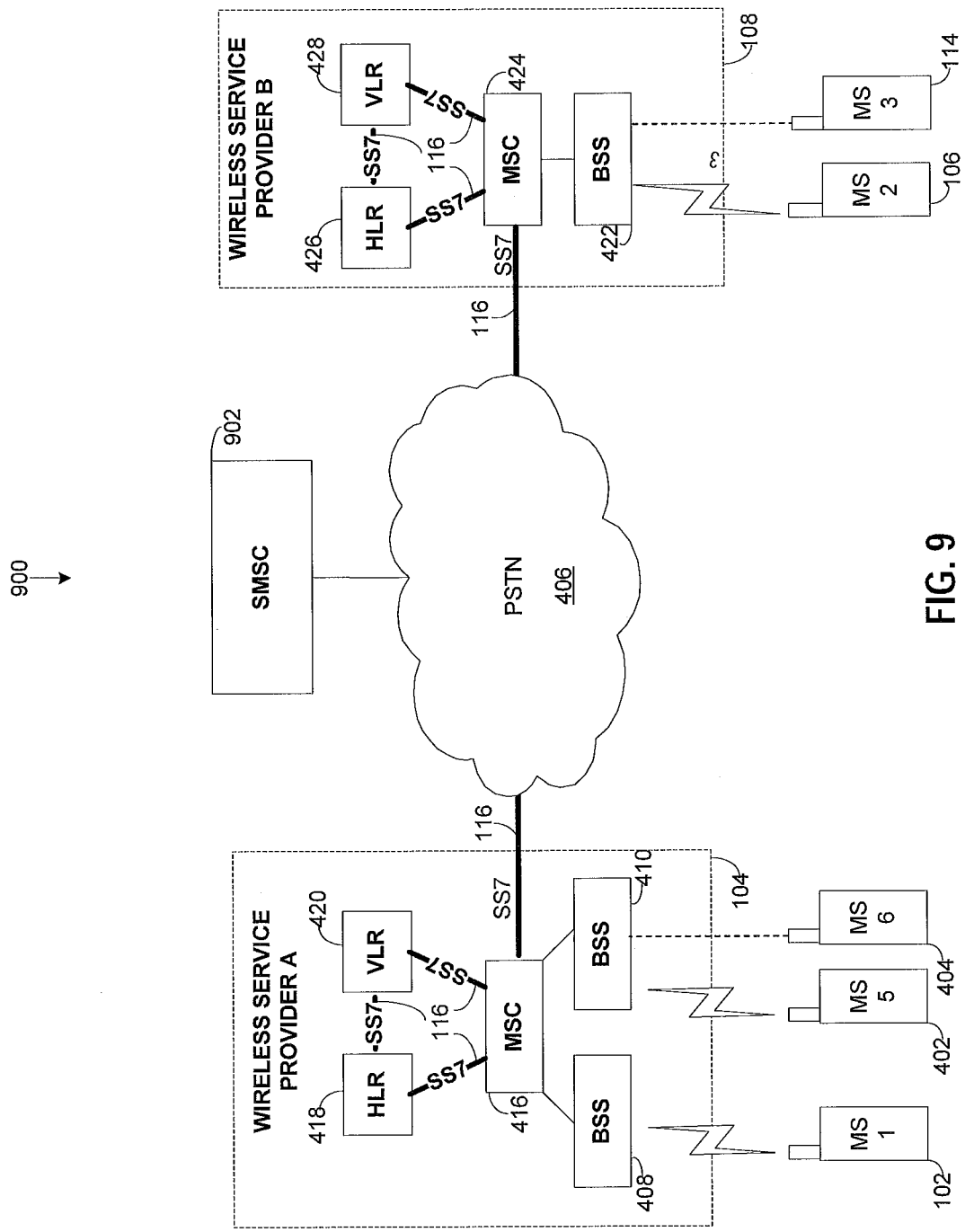
FIG. 9 is a block diagram illustrating an embodiment of a mobile communication system for determining voice call availability of a contact on a network using Short Messaging System (SMS).

FIG. 9 shows a mobile communications system 900 for determining availability of a contact on a network using Short Messaging System (SMS). In the illustrated mobile communications system 900, wireless service provider A 104 and wireless service provider 108 are each coupled to a public switched telephone network (PSTN) 406. The PSTN 406 is also in communication with a short messaging system center (SMSC) 902. Mobile station 1 102 is in communication with wireless service provider A 104 via BSS 408. Mobile station 5 402 is in communication with wireless service provider A 104 via BSS 410. Mobile station 6 404 is associated with wireless service provider A 104 (i.e., subscribed to and authorized to use wireless service from wireless service provider A), but is not currently in communication with service provider A. The BSSs 408 and 410 can include one or more BSCs operatively linked to one or more BTSs, which are connected to antennas for radiating transmitted signals and for receiving incoming signals. Moreover, the BSSs 408 and 410 are operatively linked to MSC 416, which in turn is operatively linked via SS7 trunks 116 to a HLR 418 and a visiting location register VLR 420.

Mobile station 2 106 is in communication with wireless service provider B 108 via BSS 422. Mobile station 3 114 is associated with wireless service provider B 108 (i.e., subscribed to and authorized to use wireless service from wireless service provider B), but is not currently in communication with service provider B. The BSS 422 can include one or more BSCs operatively linked to one or more BTSs, which are connected to antennas for radiating transmitted signals and for receiving incoming signals. Moreover, the BSS 422 is operatively linked to MSC 424, which in turn is operatively linked via SS7 trunks 116 to an HLR 426 and a VLR 428.

Figure 10:
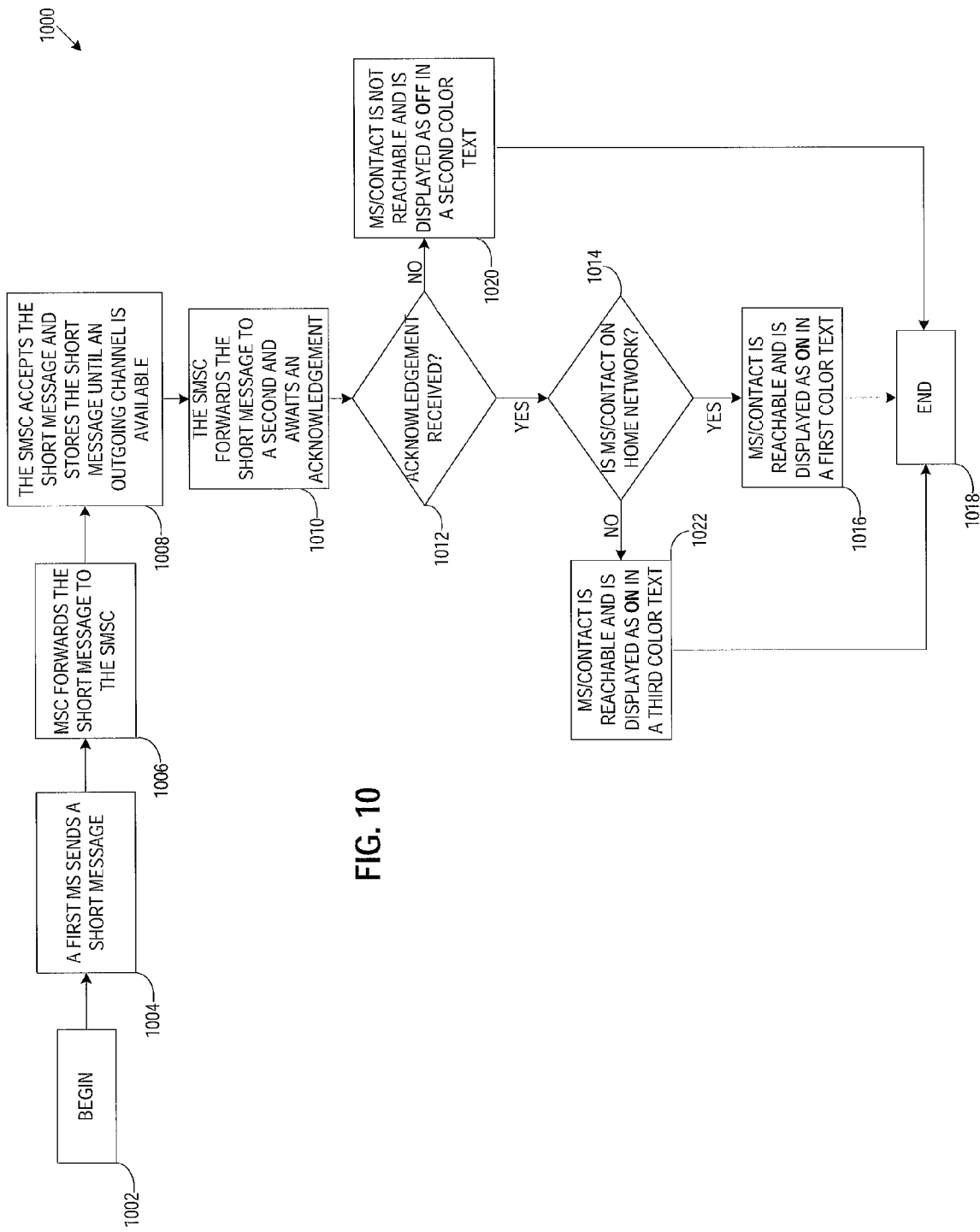
FIG. 10 is a flow chart of an exemplary method for determining the voice call availability of a contact on a network using SMS.

FIG. 10 shows a flow chart of an exemplary method 1000 for determining the voice call availability of a contact using SMS. The exemplary method 1000 is described with reference to mobile communications system 900, as a method for a first mobile station, for example, mobile station 1 102 to obtain availability status for a second mobile station, for example, mobile station 5 402, mobile station 6 404, mobile station 2 106, or mobile station 3 114. A user can either request the availability status at the time of interest, or the availability status can automatically be updated in real-time or close to real-time for a specific contact, or group of contacts.

The exemplary method 1000 begins at block 1002 and proceeds to block 1004, where a first mobile station, for example, mobile station 1 102, sends a short message to the MSC 416. At block 1006, the MSC 416 forwards the short message to the SMSC 902. At block 1008, the SMSC 902 accepts and stores the short message until an outgoing channel is available to forward the short message to a second mobile station, for example, mobile station 5 402, mobile station 6 404, mobile station 2 106, or mobile station 3 114. At block 1010, the SMSC 902 forwards the short message to the second mobile station and waits for an acknowledgement. At block 1012, if an acknowledgement is received, the exemplary method 1000 proceeds to block 1014, where a decision is made whether or not the contact resides on a home network, i.e., an HPLMN. If the contact resides on the HPLMN, the exemplary method 1000 proceeds to block 1016, where the contact can be displayed as being on and a first color text availability identifier can be used to distinguish the contact's availability from other contacts in the contact list. For example, mobile station 1 102 can be notified that mobile station 5 402 is available (i.e., on the HPLMN) and a first color text availability identifier can be used to indicate this status. The method then proceeds to block 1018, and the method ends. If the contact does not reside on the home network, for example, if the contact is roaming and in a VPLMN, the exemplary method 1000 proceeds to block 1022, where the contact can be displayed as being on and a second color text availability identifier can be used to distinguish the contact's availability from other contacts in the contact list. For example, mobile station 1 102 can be notified that mobile station 2 106 is available (i.e., on a VPLMN) and a second color text availability identifier can be used to indicate this status. The exemplary method then proceeds to block 1018 and the method ends.

If an acknowledgment is not received, at block 1012, the method 1000 proceeds to block 1020, where the contact can be displayed as being off and a third color text availability identifier can be used to distinguish the contact's availability from other contacts in the contact list. For example, mobile station 1 102 can be notified that mobile station 4 114 or mobile station 6 404 is not available (i.e., off the PLMN). The method then proceeds to block 1018, and the method ends.

Determining Availability Status via an SNMP Query

Another exemplary method for determining the availability of a contact can utilize a Simple Network Management Protocol (SNMP) query, for example, a ping. This query can comprise an IP address of the contact's mobile station or a domain name service (DNS) recognized universal resource locator (URL) of the contact's mobile station such as an access point name (APN). FIG. 4 is used to reference elements to aid in teaching the present embodiment. A ping can originate from mobile station 1 102 and be sent to mobile station 2 106 via the PSTN 406. It is contemplated that the originating mobile station and the terminating mobile station can be on the same wireless service provider network or on different wireless service provider networks, as in the present example. If an acknowledgement is received and the contact is on the HPLMN, this could be determined, for example, by examining the initial address message which returns routing information from the MSC/VLR currently servicing the mobile station. This information includes the mobile network code (MNC) which can be used to identify the service provider. The contact can be displayed as being on and a first color text availability identifier can be used to distinguish the contact's availability from other contacts in the contact list. If an acknowledgement is received and the contact is on a VPLMN, the contact can be displayed as being on and a second color text availability identifier can be used to distinguish the contact's availability from other contact in the contact list. If an acknowledgment is not received, the contact can be displayed as being off (i.e., the contact is off the PLMN) and a third color text availability identifier can be used to distinguish the contact's availability from other contacts in the contact list.

Determining Availability Status Using a Page

In addition to the methods described above, a page can be launched to the remote mobile device of interest. This page, while not call that will result in a ring, can follow much of the same signaling channels as a call would take. The acknowledgement of the page from the remote device can indicate that the device is on and ready to accept incoming calls. The advantage of using such a method is that it can cross communication network boundaries, spanning disparate types of networks, and still return the information needed to populate the contact list shown in FIG. 2. Detailed paging and acknowledgement systems and methods are described in U.S. Pat. No. 5,526,401 to Roach, Jr. et al. which is incorporated herein by reference in its entirety.

Privacy Settings

It is contemplated that in each of the disclosed embodiments, a user can be given the option to allow or disallow others from viewing availability information regarding the user's mobile station. This option can be refined by allowing a user to deny use of the availability feature globally for every contact, for specific contacts, or for any call originators. For example, if a user of mobile station 1 102 does not want any contacts to be made aware of the availability of mobile station 1 102. The user can elect to globally disallow all contacts from receiving availability information by selecting an option from a group of availability options by any means for selection. The means for selection can include, but is not limited to, touch pads, touch screens, trackballs, computer mice, keyboards, voice recognition software, or any combination thereof, and the like. If the user of mobile station 1 102 does not want specific contacts to be made aware of the availability of mobile station 1 102, the user can choose to disallow specific contacts from receiving availability by selecting an option from a group of availability options by any means for selection. The user can also elect to disallow any call originator from receiving availability information. For example, if a call originator has the user's contact information stored in the memory of the mobile equipment and/or in the SIM of their mobile station. The methods by which these options are implemented are now described with respect to each of the above-mentioned exemplary systems and methods for determining availability status.

Although examples given herein, may focus on particular wireless radio access network implementations (GSM, CDMA, etc.) the examples are not meant to be limiting. Systems and methods according to the invention which utilize one radio access network are generally adaptable to similar systems and methods utilizing an alternative radio access network by one of ordinary skill in the art.

For example, a CDMA mobile station can be queried using its mobile station integrated services digital network number (MSISDN) whereby the status of the mobile station can be determined using an initial address message (IAM). Routing information exchanged between a gateway mobile switching center (GMSC) and a home location register (HLR) can be used to determine the current wireless service provider servicing a mobile station.

The law does not require and it is economically prohibitive to illustrate and teach every possible embodiment of the present invention. Hence, the above-described embodiments are merely exemplary illustrations of implementations set forth for a clear understanding of the principles of the invention. Variations, modifications, and combinations may be made to the above-described embodiments without departing from the scope of the invention. All such variations, modifications, and combinations are included herein by the scope of this disclosure.

What is claimed is:

1. A system, comprising:
   a processor; and
   a computer-readable memory having stored thereon computer-executable code that, when executed by the processor, cause the processor to perform operations comprising:
      receiving, from a user mobile communication device, a user availability selection of a user-availability option from amongst a group of user-availability options comprising:
         an allow option for allowing an entity to view availability information corresponding to the user mobile communication device; and
         a disallow option for disallowing the entity from viewing availability information corresponding to the user mobile communication device;
      receiving, from a potential-caller mobile device, a voice-call availability query seeking to determine an availability status corresponding to the user mobile communication device;
      determining, in an availability determination act, whether the user mobile communication device is (i) available for an incoming voice call from the potential-caller mobile device over a home network shared by the user mobile communication device and the potential-caller mobile device, (ii) not available for an incoming voice call from the potential-caller mobile device over the home network but is available for the incoming voice call on another network that is not shared by the user mobile communication device and the potential-caller mobile device, or (iii) not available for the incoming voice call from the potential-caller mobile device on either network;
      transmitting to the potential-caller mobile communication device, if the potential-caller mobile communication device is associated with the entity and if the user selection availability selection indicates the allow option, and based on results of the availability determination act, a voice call availability response selected from a group consisting of:
         a home-network availability response indicating that the user mobile communication device is available on the home network shared by the user mobile communication device and the potential-caller mobile communication device, wherein the home-network availability response indicates a first color to be presented at the potential-caller mobile communication device in connection with indicating that the user mobile communication device is available on the home network;
         an ancillary network availability response indicating that the user mobile communication device is available on another network, wherein the ancillary network availability response indicates a second color to be presented at the potential-caller mobile communication device in connection with indicating that the user mobile communication device is available on another network; and
         an unavailable response indicating that the user mobile communication device is not available on the home or the other network, wherein the unavailable response indicates a third color to be presented at the potential-caller mobile communication device in connection with indicating that the user mobile communication device is not available on the home or the other network;
      determining, in a do-not-provide determination act, if the user availability selection indicates the disallow option, and if the potential-caller mobile communication device is associated with the entity, to not provide to the potential-caller mobile communication device any availability information corresponding to the mobile communication device; and
      transmitting, to the potential-caller mobile communication device in response to the do-not-provide determination act, a communication that (a) does not include availability information corresponding to the user mobile communication device and (b) is configured to cause the potential-caller mobile device to display symbolism, including a symbol, indicating that the voice call availability of the user mobile communication device is unknown.

2. The system of claim 1, wherein the symbol includes at least one question mark.

3. The system of claim 1, wherein the operations further comprise receiving from the user mobile communication device a communication indicating the entity.

4. The system of claim 3, wherein the entity indicated by the communication includes a single contact represented by pre-stored contact data associated with the user mobile communication device.

5. The system of claim 3, wherein the entity indicated by the communication includes a group comprising multiple contacts, but not all contacts, represented by pre-stored contact data associated with the user mobile communication device.

6. The system of claim 3, wherein the entity indicated by the communication includes all contacts represented by pre-stored contact data associated with the user mobile communication device.

7. The system of claim 3, wherein the entity indicated by the communication includes all potential callers.

8. A computer-readable storage device having stored thereon computer-executable code that, when executed by a processor, cause the processor to perform operations comprising:
 receiving, from a user mobile communication device, a user availability selection of a user-availability option from amongst a group of user-availability options comprising:
  an allow option for allowing an entity to view availability information corresponding to the user mobile communication device; and
  a disallow option for disallowing the entity from viewing availability information corresponding to the user mobile communication device;
 receiving, from a potential-caller mobile device, a voice-call availability query seeking to determine an availability status corresponding to the user mobile communication device;
 determining, in an availability determination act, whether the user mobile communication device is (i) available for an incoming voice call from the potential-caller mobile device over a home network shared by the user mobile communication device and the potential-caller mobile device, (ii) not available for an incoming voice call from the potential-caller mobile device over the home network but is available for the incoming voice call on another network that is not shared by the user mobile communication device and the potential-caller mobile device, or (iii) not available for the incoming voice call from the potential-caller mobile device on either network;
 transmitting to the potential-caller mobile communication device, if the potential-caller mobile communication device is associated with the entity and if the user selection availability selection indicates the allow option, and based on results of the availability determination act, a voice call availability response selected from a group consisting of:
  a home-network availability response indicating that the user mobile communication device is available on the home network shared by the user mobile communication device and the potential-caller mobile communication device, wherein the home-network availability response indicates a first color to be presented at the potential-caller mobile communication device in connection with indicating that the user mobile communication device is available on the home network;
  an ancillary network availability response indicating that the user mobile communication device is available on another network, wherein the ancillary network availability response indicates a second color to be presented at the potential-caller mobile communication device in connection with indicating that the user mobile communication device is available on another network; and
  an unavailable response indicating that the user mobile communication device is not available on the home or the other network, wherein the unavailable response indicates a third color to be presented at the potential-caller mobile communication device in connection with indicating that the user mobile communication device is not available on the home or the other network;
 determining, in a do-not-provide determination act, if the user availability selection indicates the disallow option, and if the potential-caller mobile communication device is associated with the entity, to not provide to the potential-caller mobile communication device any availability information corresponding to the mobile communication device; and
 transmitting, to the potential-caller mobile communication device in response to the do-not-provide determination act, a communication that (a) does not include availability information corresponding to the user mobile communication device and (b) is configured to cause the potential-caller mobile device to display symbolism, including a symbol, indicating that the voice call availability of the user mobile communication device is unknown.

9. The computer-readable storage device of claim 8, wherein the operations further comprise receiving from the user mobile communication device a communication indicating the entity.

10. The computer-readable storage device of claim 9, wherein the entity indicated by the communication includes a single contact represented by pre-stored contact data associated with the user mobile communication device.

11. The non computer-readable storage device of claim 9, wherein the entity indicated by the communication includes a group comprising multiple contacts, but not all contacts, represented by pre-stored contact data associated with the user mobile communication device.

12. The computer-readable storage device of claim 9, wherein the entity indicated by the communication includes all contacts represented by pre-stored contact data associated with the user mobile communication device.

13. The computer-readable storage device of claim 9, wherein the entity indicated by the communication includes all potential callers.

14. A method, comprising:
 receiving, by a system using a processor, from a user mobile communication device, a user availability selection of a user-availability option from amongst a group of user-availability options comprising:
  an allow option for allowing an entity to view availability information corresponding to the user mobile communication device; and
  a disallow option for disallowing the entity from viewing availability information corresponding to the user mobile communication device;
 receiving, by the system, from a potential-caller mobile device, a voice-call availability query seeking to determine an availability status corresponding to the user mobile communication device;
 determining, by the system, in an availability determination act, whether the user mobile communication device is (i) available for an incoming voice call from the potential-caller mobile device over a home network shared by the user mobile communication device and the potential-caller mobile device, (ii) not available for an incoming voice call from the potential-caller mobile device over the home network but is available for the incoming voice call on another network that is not shared by the user mobile communication device and the potential-caller mobile device, or (iii) not available for the incoming voice call from the potential-caller mobile device on either network;
 transmitting, by the system, to the potential-caller mobile communication device, if the potential-caller mobile communication device is associated with the entity and if the user selection availability selection indicates the allow option, and based on results of the availability determination act, a voice call availability response selected from a group consisting of:

- a home-network availability response indicating that the user mobile communication device is available on the home network shared by the user mobile communication device and the potential-caller mobile communication device, wherein the home-network availability response indicates a first color to be presented at the potential-caller mobile communication device in connection with indicating that the user mobile communication device is available on the home network;
- an ancillary network availability response indicating that the user mobile communication device is available on another network, wherein the ancillary network availability response indicates a second color to be presented at the potential-caller mobile communication device in connection with indicating that the user mobile communication device is available on another network; and
- an unavailable response indicating that the user mobile communication device is not available on the home or the other network, wherein the unavailable response indicates a third color to be presented at the potential-caller mobile communication device in connection with indicating that the user mobile communication device is not available on the home or the other network;

determining, by the system, in a do-not-provide determination act, if the user availability selection indicates the disallow option, and if the potential-caller mobile communication device is associated with the entity, to not provide to the potential-caller mobile communication device any availability information corresponding to the mobile communication device; and transmitting, to the potential-caller mobile communication device in response to the do-not-provide determination act, a communication that (a) does not include availability information corresponding to the user mobile communication device and (b) is configured to cause the potential-caller mobile device to display symbolism, including a symbol, indicating that the voice call availability of the user mobile communication device is unknown.

15. The method of claim 14, further comprising receiving from the user mobile communication device a communication indicating the entity.

\* \* \* \* \*